United States Patent [19]

Thompson et al.

[11] 4,233,843
[45] Nov. 18, 1980

[54] METHOD AND MEANS FOR MEASURING TEMPERATURE USING ACOUSTICAL RESONATORS

[75] Inventors: John H. Thompson, Severna Park; George F. Gannon, Jr., Chester; Fred G. Geil, Annapolis, all of Md.

[73] Assignee: Electric Power Research Institute, Inc., Palo Alto, Calif.

[21] Appl. No.: 955,634

[22] Filed: Oct. 30, 1978

[51] Int. Cl.³ ............................................ G01K 11/26
[52] U.S. Cl. ....................................... 73/339 A; 73/579
[58] Field of Search .............. 73/339 A, 579, DIG. 4; 331/66, 163; 310/320; 340/587

[56] References Cited

U.S. PATENT DOCUMENTS

| | | | |
|---|---|---|---|
| 3,318,152 | 5/1967 | Thompson et al. | 73/339 A X |
| 3,826,931 | 7/1974 | Hammond | 331/163 X |
| 4,039,969 | 8/1977 | Martin | 331/66 X |
| 4,102,195 | 7/1978 | Thompson et al. | 73/339 A X |

Primary Examiner—Charles A. Ruehl
Attorney, Agent, or Firm—Flehr, Hohbach, Test, Albritton & Herbert

[57] ABSTRACT

The temperature of an environment is determined by measuring the acoustical response of a temperature sensitive two mode resonator placed in the environment. Two variable frequency signals are generated and applied to the resonator, and the two resonant frequencies of the resonator are determined. Frequency difference of the two frequencies is determined, and if the difference lies within a substantially uniform frequency range, the environment temperature is calculated from at least one of the frequencies. If the difference lies outside of the substantially uniform frequency range, then at least one of the two signals is spurious and no temperature calculation is made.

18 Claims, 9 Drawing Figures

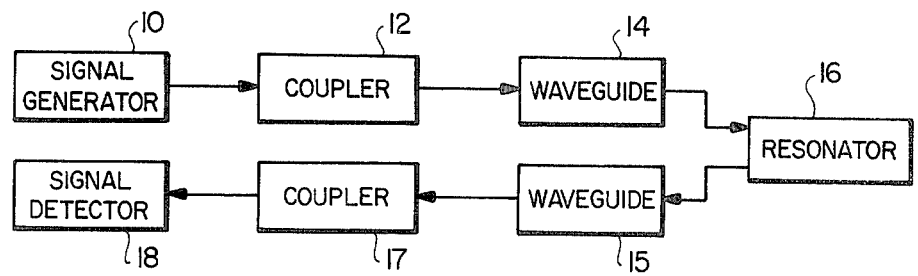
FIG_1
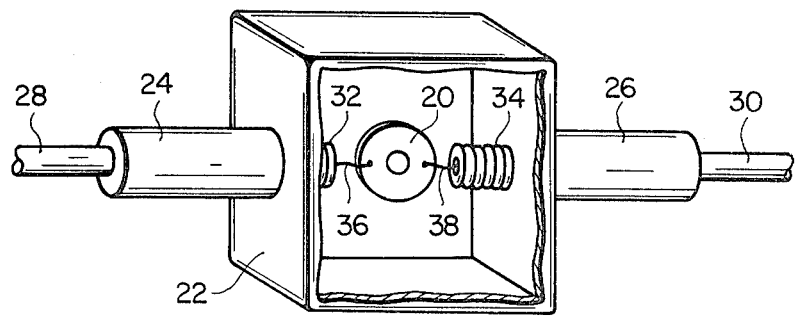
FIG_2
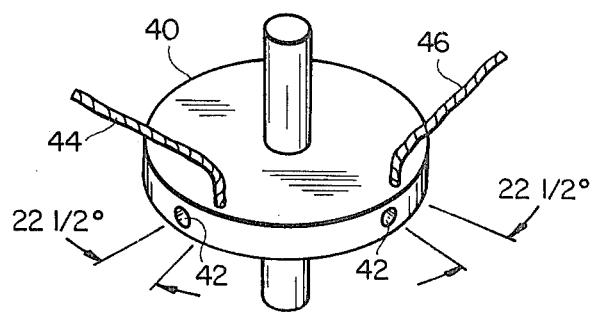
FIG_3
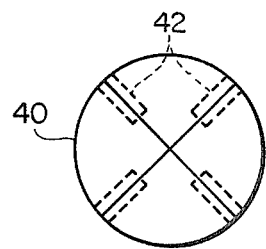
FIG_4A
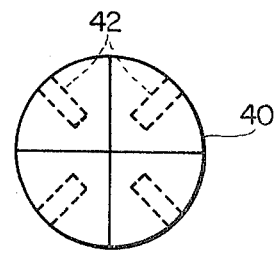
FIG_4B

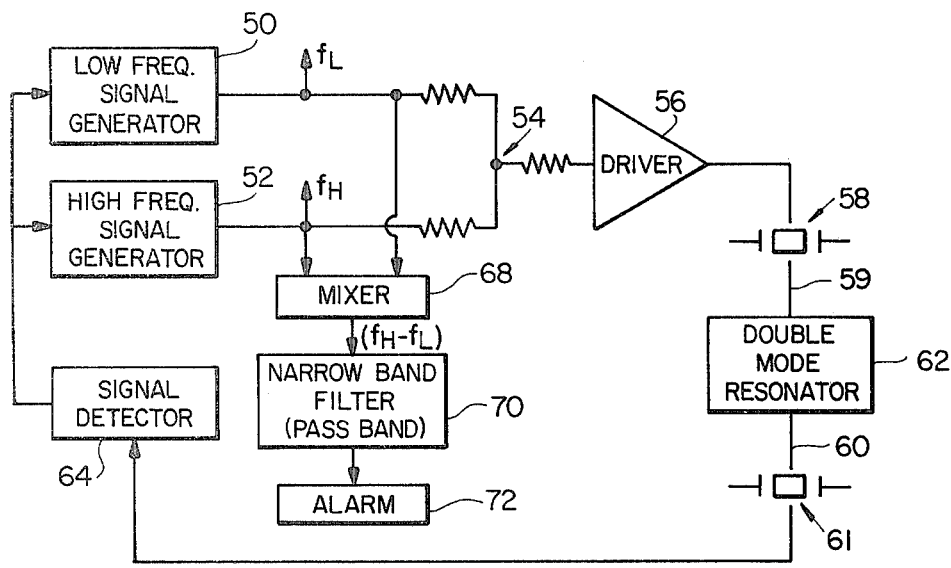
FIG_5
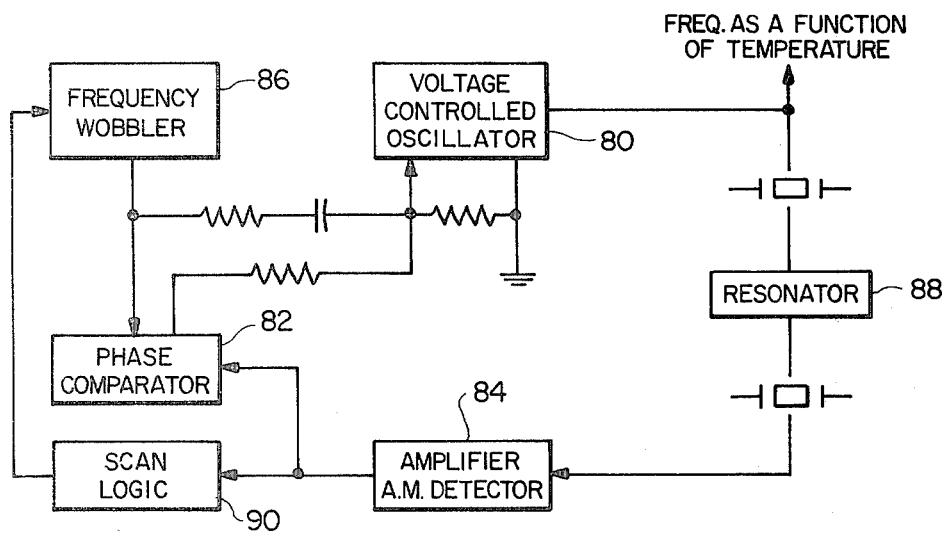
FIG_6
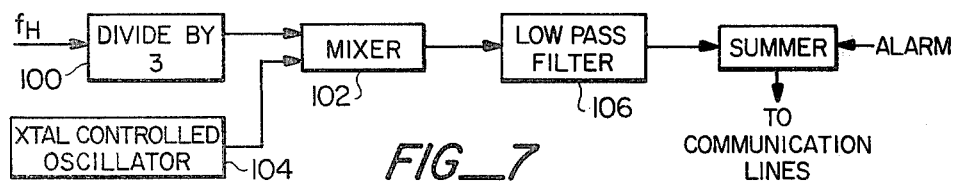
FIG_7
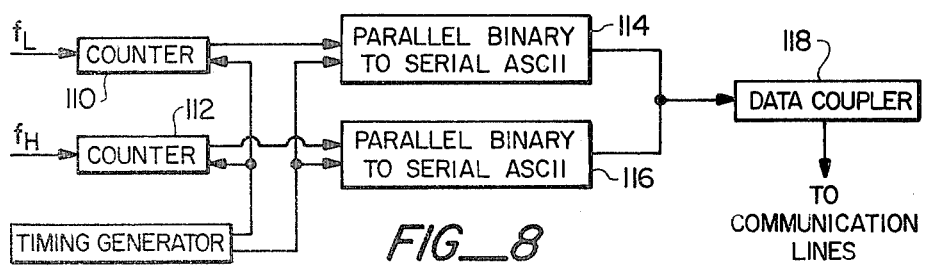
FIG_8

METHOD AND MEANS FOR MEASURING TEMPERATURE USING ACOUSTICAL RESONATORS

BACKGROUND OF THE INVENTION

1. Field of the Invention

This invention relates generally to temperature sensing apparatus, and more particularly the invention relates to temperature sensing apparatus which utilizes temperature sensitive acoustical resonators.

2. Description of the Prior Art

Various electronic apparatus is available for remotely sensing temperature. However, in some industrial applications electrical and electronic sensors are not feasible because of the particular operating environment. An example is in high power electrical transformers where operating temperature can be critical but where electrical sensors, such as thermisters or radiowave sensors, for example, could have deleterious effects.

The use of acoustical resonators in temperature sensors for such applications is known and has been successfully employed. A temperature sensitive acoustical resonator is placed in the environment whose temperature is to be sensed, and acoustical waves are directed to the resonator. By sensing the frequency of the resonant acoustical wave from the resonator, the temperature of the environment can be known since the resonant frequency is temperature dependent. One such system employs a temperature sensor similar to the sensor described in U.S. Pat. No. 3,318,152 issued to Thompson et al.

Such systems employ resonators having a single mode flexural vibration with two nodal diameters. By detecting the mechanical resonant frequency of the resonator, the temperature can be measured. For a titanium sensor the resonant frequency decreases with increasing temperature approximately 300 parts per million per degree celcius. However, other fixed vibration modes may exist because of extraneous standing waves on waveguides and resonances within the receiving and sending transducers. Such spurious resonances can result in a faulty temperature reading which can lead to improper operation of industrial apparatus such as large electrical transformers.

SUMMARY OF THE INVENTION

An object of the present invention is improved temperature sensing apparatus utilizing mechanical wave resonators.

Another object of the invention is a method of sensing the temperature of an environment with acoustical wave resonators without obtaining false responses due to spurious resonances.

A feature of the invention is the use of a temperature sensitive acoustical wave resonator having at least two modes of vibration at different resonant frequencies.

Briefly, in accordance with the invention, a temperature sensitive resonator having at least two modes of vibration at a first resonant frequency and a second resonant frequency is employed. Acoustical waves are applied to the resonator by waveguide means, and waves from the resonator are received to determine the resonant frequencies thereof. If the frequency difference between the two received resonant frequencies lies within an established frequency range, the detected frequencies are derived from the resonator and an accurate temperature reading can be determined therefrom. However, if the frequency difference between the detected signals does not lie within the established frequency range, then one or both of the detected signals is spurious and an accurate temperature reading may not be determined.

Apparatus for sensing the temperature of an environment, in accordance with the invention, includes a temperature sensitive acoustical wave resonator having at least two modes of vibration, means for generating variable frequency electrical signals, transducer means for converting the variable frequency electrical signals to acoustical signals, and first waveguide means for transmitting the acoustical signals to the resonator and second waveguide means for returning signals from the resonator. Means is provided for receiving the returned signals and determining the frequency difference thereof. If the frequency difference lies within the established frequency band for the resonant frequencies, means determines environmental temperature from at least one of the resonant frequencies detected.

The invention and objects and features thereof will be more fully understood from the following detailed description and appended claims when taken with the drawing.

BRIEF DESCRIPTION OF THE DRAWINGS

FIG. 1 is a functional block diagram of temperature sensing apparatus utilizing an acoustic resonator.

FIG. 2 is a perspective view partially in section illustrating an acoustic resonator useful in a temperature sensing apparatus.

FIG. 3 is a perspective view of a two mode resonator useful in the temperature sensing apparatus in accordance with the present invention.

FIG. 4A and FIG. 4B illustrate the two modes of vibration of the resonator shown in FIG. 3.

FIG. 5 is a functional block diagram of temperature sensing apparatus in accordance with the present invention.

FIG. 6 is a functional block diagram of electrical signal generating means useful in the circuit of FIG. 5.

FIG. 7 is a functional block diagram of circuitry useful in the system illustrated in FIG. 5.

FIG. 8 is a functional block diagram of circuitry useful with the system illustrated in FIG. 5.

DESCRIPTION OF THE PREFERRED EMBODIMENTS

FIG. 1 is a functional block diagram illustrating a temperature sensing apparatus utilizing acoustic techniques. An electrical signal generator 10 generates a signal having a frequency at or near the known resonating frequency of a single mode mechanical resonator. The electrical signal is applied to a transducer/coupler 12 which converts the electrical signal to a mechanical or acoustical signal. The acoustical signal is passed through a waveguide 14 to a mechanical resonator 16 which is placed in an environment in which the temperature is to be determined. Resonator 16 vibrates with greatest amplitude at the resonant frequency and a wave at that resonant frequency is transferred back through a second waveguide 15 and a second transducer/coupler 17 to a signal detector 18. By detecting the frequency of the received wave, hence the resonant frequency of resonator 16, the temperature of the environment in which resonator 16 is placed can be determined since the resonant frequency of the resonator is temperature dependent.

FIG. 2 is a perspective view partially in section of an acoustical resonator as disclosed in copending application Ser. No. 955,889, filed Oct. 30, 1978. assigned to the present assignee. The resonator 20 is supportably mounted within housing 22 by means of posts. Physically attached to housing 22 are two guide bushings 24 and 26 which receive waveguides 28 and 30, respectively. The waveguides 28 and 30 extend through the bushings 24, 26 and housing 22 into axially compliant members 32, 34 within housing 22. In this embodiment the compliant members 32, 34 have a bellows configuration with one closed end and an open end which is hermetically attached to the wall of housing 22. The bellows is made of metal, rubber, or plastic material. The end of waveguide 28 is attached to the interior surface of the closed end of member 32 by suitable means such as epoxy, and similarly the end of waveguide 30 is attached to the interior surface of the closed end of member 34. Attached to the exterior surface of the closed end of member 32 is a waveguide 36 such as a short length of wire which is attached at the other end to resonator 20. Similarly, a wire waveguide 38 is attached to the exterior surface of member 34 and to resonator 20. In this embodiment waveguide 30 may provide an input of acoustical energy to the resonator, and waveguide 28 may provide an output of acoustical energy from the resonator.

It is known that a flexural mode disc resonator can have more than one mode of vibration. FIG. 3 is a perspective view of a disc 40 with two modes of vibration. In order to excite the two modes, four radial holes 42 are drilled into the disc along two perpendicular diameters. Frequency separation of the resonant frequencies of the two modes is determined by hole depth. Both modes can be excited simultaneously by coupling acoustic energy to the disc by means of two wires 44 and 46 which are offset from adjacent drilled holes by $22\frac{1}{2}°$, as illustrated.

FIG. 4A and FIG. 4B are top views of disc 40 and illustrate the two nodal diameters for each mode of vibration. In FIG. 4A the nodal diameters are aligned with the drilled holes whereby vibration of the disc will lie in opposite quadrants of the disc defined by the two diameters. In FIG. 4B the second vibration mode of the disc is along the diameters lying inbetween the drilled holes 42 whereby the mechanical vibration occurs in opposite quadrants defined by the two diameters. To energize both modes simultaneously, acoustic coupling wires 44 and 46 are attached to disc 40, as shown in FIG. 3, intermediate adjacent diameters in the two modes of vibration.

In accordance with the present invention a dual mode resonator is employed in the sensing apparatus illustrated in functional block diagram in FIG. 5. A low frequency signal generator 50 generates a signal which lies within a first frequency band which includes the low resonant frequency, $f_L$, of the dual mode resonator. A second high frequency signal generator 52 generates a signal within a frequency band including the high frequency resonant mode, $f_H$, of the dual mode resonator. The signals from generators 50 and 52 are applied through a summing network shown generally at 54, and the summed signals are applied through a driver 56 to transducer-coupler 58. Transducer-coupler 58 converts the combined electrical signals to an acoustic wave which is applied through waveguide 59 to the double mode resonator 62. As above indicated, signals at the resonant frequencies of the dual mode resonator 62 are transferred through a second waveguide 60 and a second transducer coupler 61 to detector 64 which detects the two resonant frequencies. As will be described with reference to FIG. 6, signal detector 64 provides a feedback signal to generator 50 and generator 52 whereby the two signal generators lock on to the resonant frequencies of the dual mode resonator.

Importantly, while the resonant frequencies of a dual mode resonator will vary with temperature, the frequency difference between the two resonant frequencies will remain substantially constant. For example, a titanium resonator may be designed so that at 0° C. the two resonant frequencies are 170 KHz and 180 KHz. The two resonant frequencies at other temperatures will be given as follows:

low frequency $(f_L) = 170(1 - 0.003 \times T)$ high frequency $(f_H) = 180(1 - 0.003 \times T)$ where T—temperature in degrees celcius.

Thus, at 250° C. the resonant frequencies are:

$f_L = 157.25$ KHz $f_H = 166.50$ KHz

The difference between the two resonant frequencies at 0° C. is 10 KHz, and the difference in resonant frequencies at 250° C. is 9.25 KHz. Thus the difference in frequency will be substantially uniform and between 9.25 KHz and 10 KHz over the temperature range 0° C. to 250° C. Accordingly, in accordance with the invention, an erroneous readout from detected spurious signals can be eliminated by determining the difference between the two detected resonant frequencies. This is accomplished in FIG. 5 by applying the low frequency signal from generator 50 and the high frequency signal from generator 52 to a superhetrodyne mixer 68 which produces an output signal including both the sum and the difference of the two applied signals. Accordingly, the output of mixer 68 is passed through a narrow band filter 70 which is designed to pass the difference frequency signal of the two resonant frequencies of the dual mode resonator over the temperature range of operation. In the particular embodiment described, for an operating range of 0–250° C., the filter will have a pass band of 9.25 KHz to 10 KHz. If a signal within this frequency band is passed by filter 70, then the two frequency generators have been locked onto the resonant frequencies of the resonator. If the generators had been locked onto spurious modes then no signal will be passed by bandpass filter 70. Accordingly, if the system erroneously locks onto spurious signals or has equipment failure a temperature readout can be inhibited by alarm means 72.

FIG. 6 is a functional block diagram of one embodiment of a suitable frequency generator. The generator comprises a voltage controlled oscillator 80 (VCO) which is controlled by an output signal from phase comparator 82. Phase comparator 82 compares a feedback signal from AM detector 84 and a frequency wobbler 86 and provides a control voltage to VCO 80 which allows generation of an output signal which varies over a wide frequency spectrum prior to latching onto a resonant frequency. The magnitude of the detected signal from detector 84 controls scan logic 90 which biases frequency wobbler 86 so that the VCO will sweep a broad spectrum of frequencies at a relatively slow rate. After a resonant frequency is generated by VCO 80, as determined by detector 84 and the phase comparator 82, the input signal from wobbler 86 varies only a sufficient amount to maintain a frequency lock on the resonant frequency as temperature varies. In the "wobble" mode the frequency may be varied no more than 100 Hz at a 10-20 Hz/sec. rate. This signal is passed through the waveguide to resonator 88 and detected by amplitude detector 84. The signal from the detector is compared to the modulating signal from the frequency wobbler, and the resulting DC output signal shifts the voltage signal oscillator so as to keep it tuned to the peak response of the resonator.

It will be appreciated that a circuit as described in FIG. 6 is required for the low frequency generator and for the high frequency generator. In operation, the two units would search alternately and not concurrently. Upon one generator finding its proper resonance signal, the other unit would begin searching. For example, for the resonator described above, the low frequency generator would start searching slightly below 157.25 KHz (250° C.) and increase to 170.00 KHz (0° C.). Next, the high frequency resonant search is made from 180.00 KHz (0° C.) to 166.50 KHz (250° C.). Importantly, the two searches are made from opposite ends of the frequency range so as to prevent the two signal generators from locking onto the same frequency mode.

After resonant frequency lock is achieved, the temperature of the sensed environment is determined by correlating one of the resonant frequencies to a temperature scale for the resonator. To accomplish the temperature sensing at a remote station, telephone lines may be used to carry the requisite information. As shown in FIG. 7, the high frequency resonate signal, $f_H$ is applied through a divider 100 to limit the signal frequency to the communication line bandwidth. The output of divider 100, ranging from 60 KHz to 55.5 KHz is then applied to mixer 102 along with a fixed frequency (61 KHz) from oscillator 104, and the output of mixer 102 is passed through filter 106 to produce the difference frequency which will be from 1KHz for 0° C. to 5.5 KHz for 250° C. A substantial portion of the difference signal (i.e. up to about 4 KHz) can be transmitted over a telephone line, thus, a signal for 0° C. to about 200° C., along with the alarm signal from the circuit of FIG. 5, are summed and applied to the communication line.

The system can also be structured to accommodate automatic computation means such as illustrated in FIG. 8. The high and low frequencies from the resonator are applied to digital counters 110 and 112, respectively, and the counts are converted to suitable computer code by converters 114 and 116. The coded frequency signals are then applied by data coupler 118 through a communication line to a computer processing station, and computer means can then read the frequencies, compute the frequency difference, compute temperature, and determine if the system is giving correct readings.

The method of detecting temperature of an environment through use of acoustic apparatus as described herein provides a more reliable temperature reading with the effects of spurious signals being minimized. While the invention has been described with reference to specific embodiments, the description is illustrative and is not to be construed as limiting the scope of the invention. Various modifications, changes, and applications may occur to those skilled in the art without departing from the true spirit and scope of the invention as defined by the appended claims.

What is claimed is:

1. the method of measuring the temperature of an environment by sensing the response of a temperature sensitive acoustical resonator comprising
   (a) providing in said environment a temperature sensitive resonator having at least two modes of vibration with a first resonant frequency and a second resonant frequency, said first and second resonant frequencies varying with temperature proportionately with said first frequency and said second frequency having a substantially uniform frequency difference,
   (b) applying to said temperature sensitive resonator by waveguide means an acoustical signal including said first and second resonant frequencies,
   (c) establishing the frequencies of said first resonant frequency and said second resonant frequency,
   (d) comparing the frequency difference of said first resonant frequency and said second resonant frequency with said substantially uniform frequency difference thereby detecting if a spurious signal has been received, and
   (e) determining the temperature of said environment from at least one of said resonant frequencies.

2. The method of measuring the temperature of an environment as defined by claim 1 wherein said acoustical signal is applied by means of a variable frequency generator and transducer.

3. The method of measuring the temperature of an environment as defined by claim 2 wherein said first resonant frequency and said second resonant frequency are established by a voltage controlled oscillator and phase comparator means which compares a signal from a wobbler source and a detected AM signal from said resonator
   and applying as a control signal to said variable frequency generator an output signal based on said comparison.

4. The method of measuring the temperature of an environment as defined by claim 3 wherein said step of comparing the frequency difference of said first resonant frequency and said second resonant frequency comprises applying said first resonant frequency signal and said second resonant frequency signal to mixer means and passing the output signal from said mixer means to a filter having a pass band including said substantially uniform frequency difference and sensing the signal from said filter.

5. The method of measuring the temperature of an environment as defined by claim 4 and including the step of inhibiting the determination of temperature in step (e) when said signal from said filter is not at least of a minimum value, thereby indicating the presence of a spurious signal.

6. The method of measuring the temperature of an environment defined by claim 3 and including the steps of counting said first resonant frequency and converting said count to a digital code, counting said second resonant frequency and converting said count to a digital code, and applying said digital code for said first resonant frequency and said second resonant frequency to computer means for computing the environmental temperature and determining if signals are spurious.

7. The method of measuring the temperature of an environment as defined by claim 1 wherein said step of comparing the frequency difference of said first resonant frequency and said second resonant frequency comprises applying said first resonant frequency signal and said second resonant frequency signal to mixer means and passing the output signal from said mixer means to a filter having a pass band including said substantially uniform frequency difference and measuring the signal from said filter.

8. The method of sensing the temperature of an environment as defined by claim 7 and including the step of inhibiting the determination of temperature in step (e) when said signal from said filter is not at least of a minimum value, thereby indicating the presence of a spurious signal.

9. The method of measuring the temperature of an environment as defined by claim 1 and including the steps of counting said first resonant frequency and converting said count to a digital code, counting said second resonant frequency and converting said count to a digital code, and applying said digital code for said first resonant frequency and said second resonant frequency to computer means for computing the environmental temperature and determining if signals are spurious.

10. Apparatus for measuring the temperature of an environment comprising
 (a) a temperature sensitive acoustical resonator having at least two modes of vibration defined by a first resonant frequency and a second resonant frequency, said first and second resonant frequencies varying with temperature with the frequency difference thereof defining a substantially uniform frequency range;
 (b) means for generating variable frequency electrical signals,
 (c) transducer means for converting said variable frequency electrical signals to acoustical signals,
 (d) waveguide means for transmitting said acoustical signals to said resonator and returning resonance signals from said resonator at said first resonant frequency and said second resonant frequency,
 (e) means for receiving said resonance signals and determining the frequency difference thereof, and
 (f) means for determining environmental temperature from at least one of said first and second resonant frequencies when said frequency difference is within said substantially uniform frequency range.

11. Apparatus as defined by claim 10 wherein said means for generating variable frequency electrical signals comprises a variable frequency electrical signal source, a phase comparator for comparing a signal from said variable frequency electrical signal source and a feedback signal and generating an output signal in response to said comparison, a voltage controlled oscillator including a control terminal for receiving said output signal from said phase comparator, and detector means for receiving said resonance signals and providing said feedback signal to said phase comparator.

12. Apparatus as defined by claim 11 wherein said detector means comprises an AM detector.

13. Apparatus as defined by claim 10 wherein said means for generating variable frequency electrical signals generates two electrical signals whereby a signal at said first resonant frequency and a signal at said second resonant frequency can be generated concurrently.

14. Apparatus as defined by claim 13 wherein said means for determining the frequency difference of said resonance signals comprises mixer means operably connected to receive as input the two signals from said means for generating variable frequency electrical signals and producing an output signal including a signal at the frequency difference of said two signals.

15. Apparatus as defined by claim 14 wherein said means for determining the frequency difference of said resonance signals further includes filter means having a frequency band pass including said substantially uniform frequency range whereby a signal is passed by said filter means when said first and second resonant frequencies are detected.

16. Apparatus as defined by claim 10 and including counter means for counting the frequency of said first resonant frequency and the frequency of said second resonant frequency and producing digital count signals, and means for applying said digital count signals to computer means for determining frequency difference and environment temperature.

17. Apparatus as defined by claim 10 wherein said means for determining environment temperature includes divider means for receiving a resonant frequency signal and producing a lower frequency signal therefrom, a fixed frequency signal source, mixer means for receiving said lower frequency signal and said fixed frequency signal and producing a signal whose frequency is correlated to temperature.

18. Apparatus as defined by claim 17 wherein said means for generating variable frequency electrical signals generates two electrical signals and further including means for inhibiting temperature determination when the frequency difference between said two signals lies outside of said substantially uniform frequency range.

* * * * *